(12) United States Patent
Walsh et al.

(10) Patent No.: US 6,906,654 B2
(45) Date of Patent: Jun. 14, 2005

(54) DATA RECOVERY

(75) Inventors: Peter Arthur Walsh, Burnham-on-Sea (GB); Rafel Jibry, Bristol (GB)

(73) Assignee: Hewlett-Packard Development, L.P., Houston, TX (US)

( * ) Notice: Subject to any disclaimer, the term of this patent is extended or adjusted under 35 U.S.C. 154(b) by 0 days.

(21) Appl. No.: 10/609,128

(22) Filed: Jun. 30, 2003

(65) Prior Publication Data

US 2004/0061632 A1 Apr. 1, 2004

(30) Foreign Application Priority Data

Jun. 29, 2002 (GB) .............................................. 0215109

(51) Int. Cl.$^7$ ................................................ H03M 1/12
(52) U.S. Cl. ...................................... 341/155; 341/156
(58) Field of Search ................................ 341/155, 156, 341/94

(56) References Cited

U.S. PATENT DOCUMENTS 5,373,513 A * 12/1994 Howe et al. ................. 714/775
6,617,985 B1 * 9/2003 Poeppelman ................. 341/94

FOREIGN PATENT DOCUMENTS

EP 0 926 671 6/1999
WO WO 99/18575 4/1999

OTHER PUBLICATIONS

William E. Ryan, Comparative Performance Between Drop-out Detection and Viterbi Reliability Metric Erasure Flagging, Sep. 1992, pp. 2898–2900, IEEE Transactions on Magnetics, vol. 28, No. 5.
Toshihiko Morita et al., ECC–Less LDPC Coding for Magnetic Recording Channels, Sep. 2002, pp. 2304–2306, IEEE Transactions on Magnetics, vol. 38, No. 5.

* cited by examiner

Primary Examiner—Peguy JeanPierre
Assistant Examiner—Joseph Lauture

(57) ABSTRACT

Encoded data is decoded by a receiver for an analogue input signal that is converted into a digital signal. A detector produces a sequence of data representative of the analogue signal, a decoder for the sequence of data outputs data indicating that a sequence includes an error. An event detector detects an event which substantially alters or destroys the analogue input signal. The decoder outputs data corresponding to the or each sequence resulting from the altered or destroyed analogue input signal indicating that the sequence is incorrect.

15 Claims, 2 Drawing Sheets

DATA RECOVERY

FIELD OF THE INVENTION

This invention relates to a data recovery apparatus and method, and more particularly, to error detection and/or correction in data recovery apparatus, and a method of recovering, in digital format, analogue data recorded on a medium, such as a tape.

BACKGROUND TO THE INVENTION

It is known to use an analogue chip to recover, in digital format, analogue data which is recorded on a medium, such as a tape. Referring to FIG. 1 of the drawings, which illustrates a simplified version of such analogue chip, such a data recovery circuit generally comprises a variable gain amplifier (VGA) 100, which receives analogue signal 102 from a tape (not shown), a filter 104 to smooth the analogue waveform, an analogue-to-digital converter (ADC) 106 for converting, the smoothed analogue waveform 108 into a 6-bit digital signal, a digital signal processing module 110, a Viterbi decoder 112 to produce a 6-bit output, and an RRL decoder 114, which produces 4-bit output data.

The output from the RLL decoder 114 is then input to an error correction circuit (not shown). In general, the number of errors which known error correction circuits can detect and/or correct is dependent on the number of parity symbols which are added to the data. An error in a code word has two unknown quantities, namely its location and the amount by which a symbol is incorrect. If, for example, four parity symbols are added to each code word, a conventional error detection/correction circuit can deal with four unknown quantities, i.e. two errors. If, however, the location of an error is known, there is only one unknown quantity, so the circuit can handle up to four errors in a code word if their locations are known. The term used to describe an error whose location is known is an "erasure", and, in general, conventional error correction circuits can correct twice as many erasures as errors.

When analogue data is read from a tape (not shown), it is common for errors to occur, which result in bad data being read. For example, the tape may flap away from the tape head ("drop-out") or the temperature of a magneto resistive head may suddenly change, causing a thermal asperity. A change in the head temperature causes a change in the head resistance resulting in a DC shift in the analogue signal. The temperature of the head can change suddenly when a piece of dust or debris on the tape hits the head. The dust or debris either heats the head due to friction, or cools the head by conduction. The tape channel is AC coupled to the head so, after a certain amount of time (dependent upon the magnitude of the DC shift), the signal comes back into range. However, in the meantime, the DC shift can cause the timing lock of the clock 116, which controls the sampling time of the analogue-to-digital converter 106, to be lost. To prevent or rectify this problem, the conventional circuit includes a thermal asperity detector 118, the output of which is fed to the digital signal processing module 110, which controls the timing recovery circuit 120. Asperity detector 118 thus detects an event that alters or destroys analogue input signal 102.

During normal operation, the digital signal processing module 110 performs phase adjustments in a timing recovery circuit 120. However, in the event that a thermal asperity is detected, the digital signal processing module 110 allows the timing recovery circuit 120 to coast over known bad areas, i.e. in effect, it does not update the phase adjustments in the timing recovery circuit 120, thereby ensuring that erroneous data does not adjust the position of the sampling point.

In the conventional circuit, however, the output from the digital signal processing module 110 is still fed to the Viterbi decoder 112 which outputs the most likely sequence of data to be input to the RLL decoder 114. Decoder 112 does not known that the data it is processing is bad data and outputs a sequence of data to the RLL decoder 114 in the usual manner. Not every sequence of bits is a valid RLL encoded sequence, and the RLL decoder 114 marks such invalid sequences as errors by setting an erasure flag to 1. The erasure flag is 0 if the sequence is a valid RLL encoded sequence.

In the prior art circuit, though, some of the data sequences output by the Viterbi decoder 112 in response to bad data are valid RLL encoded sequences (even though they are incorrect) and, as such, are not recognised as errors so no erasure flag is set. Nevertheless, as stated above, it is highly desirable for the error correction circuit (not shown) to know the location of errors, as this doubles its error correction capability.

EP-A-0926671 describes a data recovery circuit similar to the one described above, in which a thermal asperity detector is provided. The output from the RLL decoder is still output from the circuit. In addition, this output is fed into an error generation circuit, together with the output from the thermal asperity detector, and the output from the error generation circuit (which comprises an error signal indicating data sequences which are incorrect due to thermal asperity having occurred) is also output from the circuit. Thus, the arrangement described in EP-A-0926671 is an ASIC (Application Specific Integrated Circuit) having two separate outputs, one for the data itself, and one for the error signal.

In order to communicate the outputs generated by the above-described ASIC, therefore, an additional pin/line is required. However, it is highly desirable to minimise the pin count and communications lines between ASICs because:

(a) an increase in the number of pins causes a corresponding increase in size of the ASIC package, which increases its consumption of circuit board space accordingly;

(b) each pin in an ASIC requires a pad on a silicon wafer in the package, with each pad taking up space, potentially wasting silicon and increasing the price of the ASIC; thus, the above-mentioned increase in number of pins on the ASIC is for this reason undesirable;

(c) the larger the number of electrical communication lines in a package, the higher its power consumption is, which is again undesirable.

U.S. Pat. No. 5,373,513 describes a decoder for receiving and recovering encoded data. The decoder includes a peak polarity processor which senses the presence of the additive errors in the playback RLL data. The peak polarity processor classifies each additive error as either a drop-in or drop-out error and flags the affected code symbol location to the decoder as an erasure.

WO 99/18575 describes a decoder in which a thermal asperity detector is provided. When thermal asperity is detected, an event signal is fed back to activate a squelch circuit which removes large offsets caused by the thermal asperity while leaving minimal transient before the digital signal is fed to the Viterbi detector.

SUMMARY OF THE INVENTION

In accordance with one aspect of the present invention, a decoding apparatus for the recovery of encoded data comprises an analogue-to-digital converter for receiving an analogue input signal and converting it into a digital signal, a detector for producing sequences of data representative of the analogue signal, and a decoder arranged to output data indicating that a sequence includes an error. The apparatus further comprises an event detector for detecting an event which substantially alters or destroys the analogue input signal. The detector has an input responsive to one or more event signals indicating the occurrence of such an event in response to which the detector responds to the one or more event signals by outputting one or more invalid data sequences. The decoder outputs a data stream representing the analogue input signal and including data corresponding to the or each sequence resulting from the altered or destroyed analogue input signal indicating that the sequence is incorrect.

Also in accordance with the present invention, a method of recovering encoded data comprises the steps of receiving an analogue input signal and converting it into a digital signal, producing sequences of data representative of the analogue signal, decoding the sequence of data, and outputting it together with data indicating whether or not a sequence includes an error. The input signal is monitored and an event which substantially alters or destroys the analogue input signal is detected. One or more event signals indicating the occurrence of such an event is produced. In response to the one or more event signals one or more invalid sequences of data are produced. A single communication path outputs a data stream representing the analogue input signal and including data corresponding to the or each sequence resulting from the altered or destroyed analogue input signal to indicate that the sequence is incorrect.

Thus the present invention provides an improved apparatus for and method of indicating the positions of errors in a data stream, being communicated between two ASICs for example, where the read channel expects there to be errors in the data stream, due for example, to mis-detection or thermal asperity events which severely distort the incoming signal. The error signal is delivered from the read channel detector using the same communication line (both physically and functionally) in the ASIC as is used to deliver the digital data itself. Thus, the functionality of the prior art is achieved without an increase in the number of pines/lines required between different ASICs.

An object of the invention is achieved, in a specific embodiment, by intentionally transmitting a predetermined pattern which does not comply with RLL decoder rules, rather than the erroneous data stream. The predetermined violating pattern in the receiving ASICs decoder marks the position of specific types of errors in the data stream. Preferably, the event detector is coupled or connected to the detector for producing a sequence of data representative of the analogue signal or to the decoder.

In one preferred embodiment therefore, the detector is a Viterbi detector which receives the digital input signal and produces the most likely resultant sequence of data. The decoder is preferably an RLL decoder which decodes the sequence of data and produces n-bit code words which are output together with a flag which is set to 0 if the code word is thought to be correct, and 1 if the input sequence is recognised as being invalidly RLL encoded. Thus, as described above, in a preferred embodiment of the invention, the detector is arranged to output an input sequence which is known to be validly RLL encoded if the event detector detects an event which substantially alters or destroys the corresponding analogue input signal.

In other words, in the case where the event detector is connected to the (Viterbi) detector, the event detector forces the detector to output an invalid (RLL) encoded sequence of data, which results in the decoder outputting code words having the error flag set to 1 representative of the duration of the event. In the case where the event detector is connected directly to the decoder, however, it simply causes the decoder to output code words with the erasure flag set to 1 for the duration of the event.

The event detector is beneficially a thermal asperity detector, although it is envisaged that apparatus for detecting "drop-outs" and the like can be alternatively or additionally used. The thermal asperity (or other event) detector is preferably connected or coupled to the (Viterbi) detector or the (RLL) decoder by a shift or delay circuit.

In the case where the event detector is a thermal asperity detector, this preferably holds predetermined positive and negative thresholds and, if the analogue input signal exceeds the positive and/or goes below the negative threshold for more than a predetermined period of time, thermal asperity is indicated to have occurred. The event detector preferably outputs one or more signals indicating that an event is occurring until the event terminates; in this case, such an event signal would be output for the period of time during which the signal is outside the threshold value(s).

BRIEF DESCRIPTION OF THE DRAWINGS

An embodiment of the invention will now be described by way of example only and with reference to the accompanying drawings, in which.

DETAILED DESCRIPTION OF THE INVENTION

Figure 1:
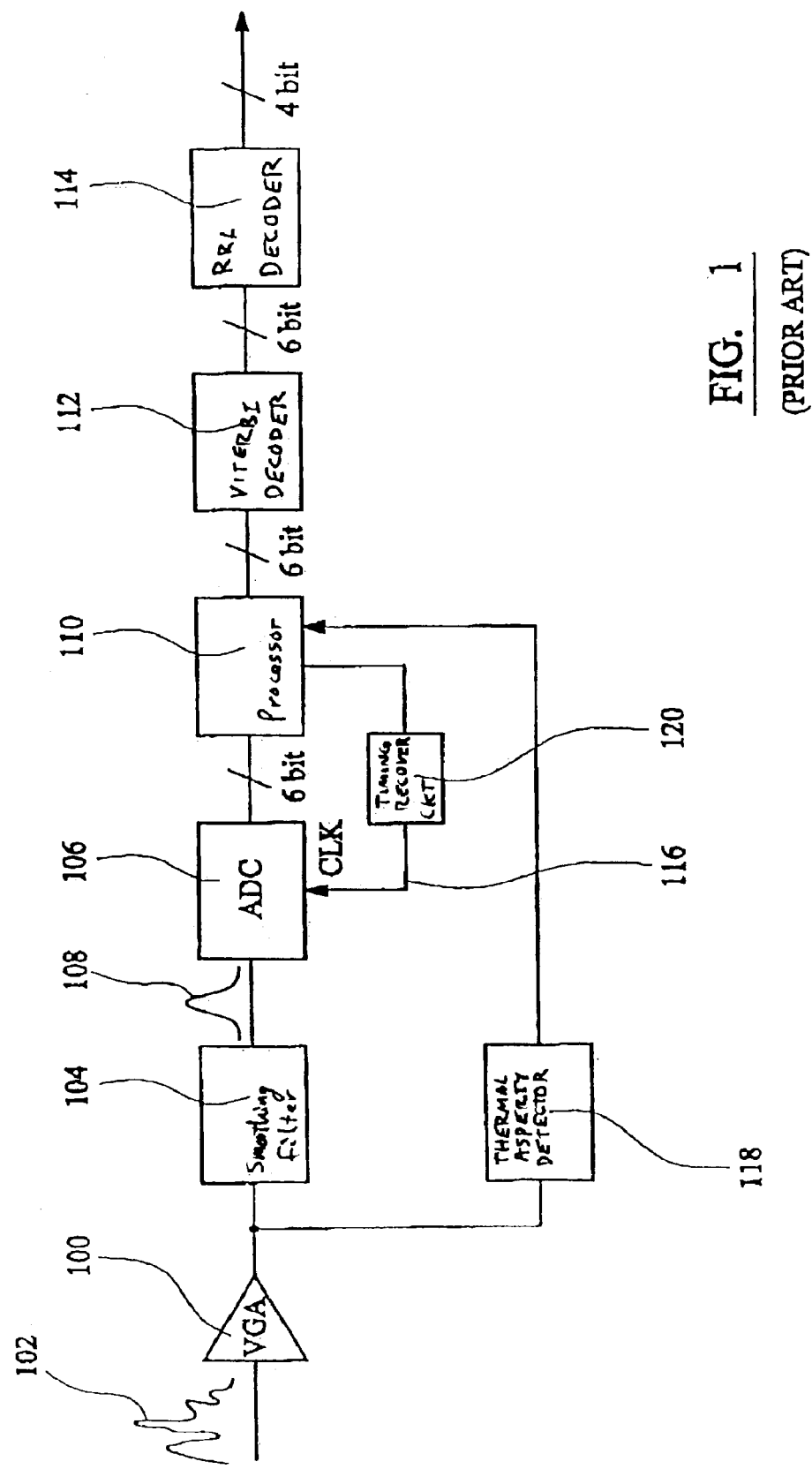
FIG. 1, as described, is a simplified schematic block diagram of a decoding circuit according to the prior art.
Figure 2:
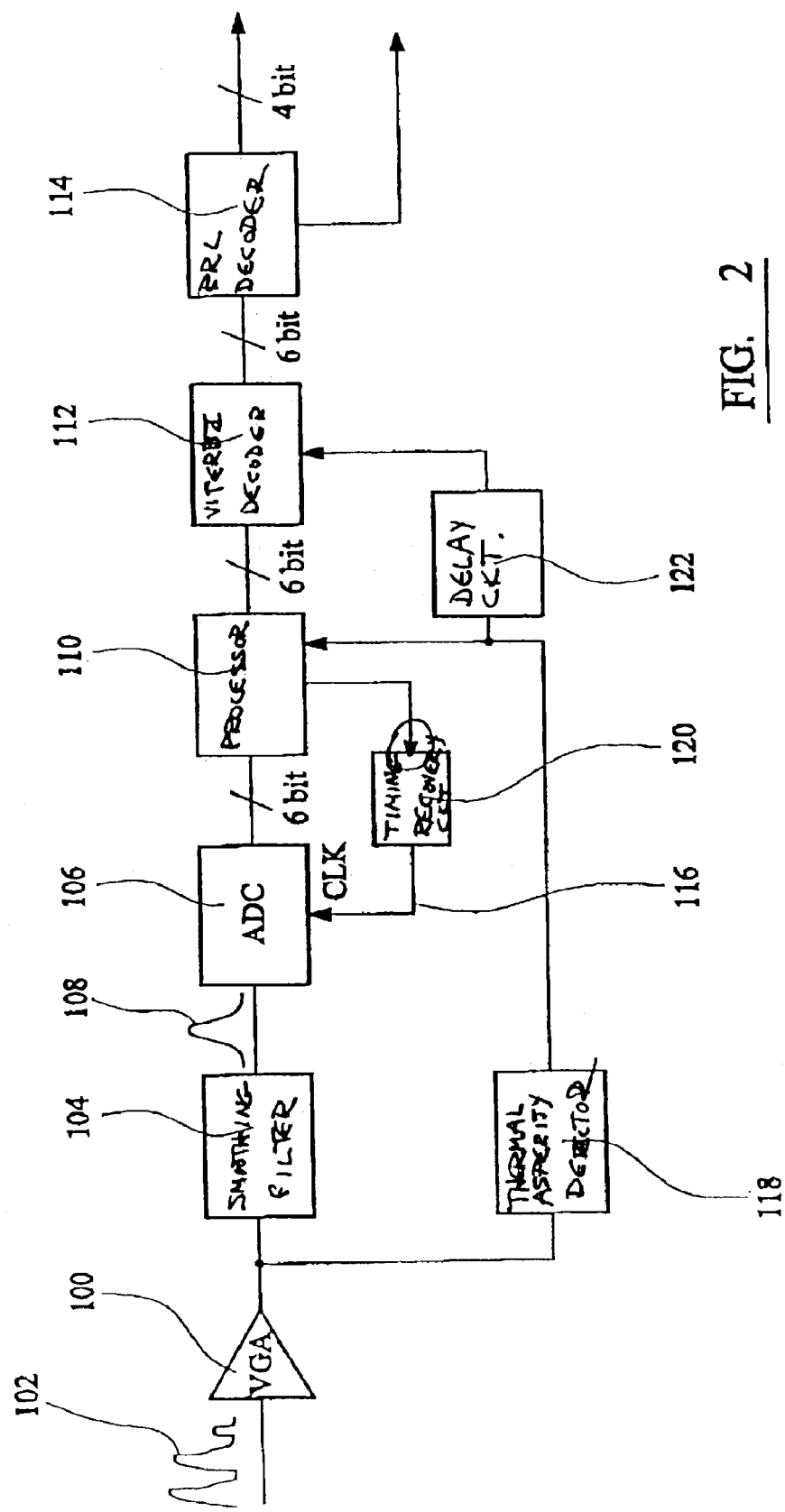
FIG. 2 is a simplified schematic block diagram of a decoding circuit according to an exemplary embodiment of the present invention.

FIG. 2 includes many of the same components as the circuit shown in FIG. 1, and like components between FIGS. 1 and 2 are denoted by the same reference numerals.

In FIG. 2, however, the thermal asperity detector 118 is also connected, to the Viterbi decoder 112 via a shift register or delay circuit 122. The thermal asperity detector 118 holds positive and negative thresholds and operates in accordance with an algorithm which states that if the analogue waveform read from the tape exceeds the positive or drops below the negative threshold for more than a predetermined period of time, then thermal asperity has occurred. Thus, if the analogue waveform 102 exceeds the positive threshold or drops below the negative threshold for more than the predetermined time period, thermal asperity detector 118 derives an output signal indicating detection of an event that causes altering or destroying of analogue signal 102. The thermal asperity detector 118 sends one or more event signals to the Viterbi decoder 112 indicating that thermal asperity has occurred and continues to send such event signals until the thermal asperity ends, i.e. the input signal returns to a value within the threshold(s). Viterbi decoder 112 responds to receipt of the signal from the thermal asperity detector 118 to produce invalid RLL encoded data sequences for the duration of the bad data caused by thermal asperity, thereby causing the RLL decoder 114 to produce erasures for each sequence resulting from the bad data.

Thus, the error correction capability of the error detection and/or correction circuit (not shown) is greatly improved by marking known bad data as erasures.

Of course, the output of the shift register 122 could be connected directly to the RLL decoder 114, thereby causing the RLL decoder to set the erasure flags for each sequence of data resulting from the bad data. However, this is only really practical if the RLL decoder 114 is on the same chip as the thermal asperity detector, which it often is. Otherwise, additional pins and connections would be necessary.

While a particular embodiment of the present invention has been shown and described in detail herein, it may be obvious to those skilled in the art that changes and modifications to the present invention in its various aspects, may be made without departing from the invention in its broader aspects, some of which changes and modifications being matters or routine engineering or design, and others being apparent after study. As such, the scope of the invention should not be limited by the particular embodiments and instructions described herein, but should be defined by the appended claims and equivalents thereof. Accordingly, the aim of the appended claims is to cover all such changes and modifications as fall within the true scope of the invention.

What is claimed is:

1. Decoding apparatus for the recovery of encoded data, the apparatus comprising an analogue-to-digital converter for receiving an analogue input signal and converting it into a digital signal; a decoder arrangement arranged to be responsive to a signal resulting from the digital signal for deriving (a) sequences of the data representative of said analogue signal and (b) an output indicating that a sequence includes an error; an event detector for detecting an event that causes substantial altering or destroying of said analogue input signal, said decoder arrangement being arranged to (a) derive one or more invalid sequences as a result of the event occurring, (b) derive a data stream representing said analogue input signal, and (c) respond to the event detector detecting the event by indicating that the one or more invalid sequences derived thereby is or are respectively incorrect.

2. Apparatus according to claim 1, wherein the event detector is coupled or connected to the decoder arrangement for producing a sequence of data representative of the analogue signal.

3. Apparatus according to claim 1, wherein the decoder arrangement includes a Viterbi decoder and an RLL decoder for decoding the sequence of data and producing n-bit code words which are arranged to be derived together with data indicating whether or not each of said code words is correct.

4. Apparatus according to claim 3, wherein said decoder arrangement is arranged to respond to said event detector detecting an event that causes substantial altering or destroying of said analogue input signal by generating one or more code words representative of said altered or destroyed input signal, together with data indicating that said one or more code words are incorrect.

5. Apparatus according to claim 4, wherein the event detector is coupled or connected to said decoder arrangement, said decoder arrangement being arranged to respond to said event detector detecting an event that causes substantial altering or destroying of said analogue input signal by generating an invalid encoded sequence of data, so the decoder arrangement is arranged to output code words including data indicating that said code words are incorrect representations of the duration of the event.

6. Apparatus according to claim 4, wherein said event detector is coupled or connected to said decoder arrangement, said decoder arrangement being arranged to respond to said event detector detecting an event that causes substantial altering or destroying of said analogue input signal by deriving code words representative of said analogue input signal together with data indicating that said code words are incorrect.

7. Apparatus according to claim 1, wherein the event detector is a thermal asperity detector.

8. Apparatus according to claim 1, wherein said event detector is connected or coupled to the decoder arrangement by a shift or delay circuit.

9. Apparatus according to claim 1, combination with a transducer head for a magnetic record.

10. A method of recovering encoded data, comprising the steps of receiving an analogue input signal and converting it into a digital signal, producing sequences of data representative of said analogue signal, and decoding said sequence of data and outputting it together with data indicating whether or not the sequence includes an error, monitoring said input signal and detecting an event which substantially alters or destroys said analogue input signal, producing an event signal indicating the occurrence of such an event, producing one or more invalid sequences of data as a result of the event occurring, and deriving on a single communication path a data stream representing said analogue input signal and including data corresponding to the or each sequence resulting from said altered or destroyed analogue input signal that indicates said sequence is incorrect.

11. Decoding apparatus for the recovery of encoded data, the apparatus comprising an analogue-to-digital converter for receiving an analogue input signal and converting it into a digital signal, a decoder arrangement for (a) producing sequences of data representative of said analogue signal, and (b) deriving data indicating that one of the sequences includes an error, an event detector for detecting an event that causes substantial altering or destroying of said analogue input signal, the event detector being coupled or connected to said decoder arrangement and arranged to provide as an input to the decoder arrangement one or more event signals for the duration of a detected event, the decoder arrangement being arranged to respond to receipt of said one or more event signals by outputting an invalid encoded sequence of data and deriving output code words including data indicating that said code words are an incorrect representation of the duration of the event.

12. Apparatus according to claim 11, in combination with a transducer head for a magnetic record.

13. Decoding apparatus for the recovery of encoded data, the apparatus comprising an analogue-to-digital converter for receiving an analogue input signal and converting it into a digital signal, a decoder arrangement for producing (a) sequences of data representative of said analogue signal, and (b) output data indicating that a sequence includes an error, an event detector for detecting an event that causes substantial altering or destroying of said analogue input signal, said event detector being coupled or connected to said decoder and arranged to provide as an input to said detector one or more event signals indicating the occurrence of an event that causes substantial altering or destroying of said analogue input signal, said decoder arrangement being arranged to be responsive to said one or more event signals to output code words representative of said analogue input signal together with data indicating that said code words are incorrect.

14. A method of processing a digital signal resulting from readout of an analogue signal that results from reading data from a recording medium, the analogue signal being substantially altered or destroyed as a result of an event occurring during the readout, the method comprising:

decoding the digital signal resulting from the analogue signal that is substantially altered or destroyed, the decoding step resulting in a sequence of bits representing the read out analogue signal, the sequence of bits including what appear to be good and bad data;

supplying the decoded digital signal to a decoder that marks as invalid bad data of the decoded digital signal; and marking the data that appears to be good and which is derived while the analogue signal is substantially altered or destroyed from being indicated by the decoder as bad data.

15. Apparatus for processing a digital signal resulting from readout of an analogue signal that results from reading data from a recording medium, the analogue signal having a tendency to be substantially altered or destroyed as result of an event occurring during the readout, the apparatus comprising a detector for an event that causes the analogue signal to be substantially altered or destroyed, a decoder arrangement for the digital signal resulting from the analogue signal that has a tendency to be substantially altered or destroyed, the decoder arrangement being arranged to derive a sequence of bits representing the read out analogue signal, the sequence of bits representing the read out analogue signal having a tendency to include what appears to be good and bad data while the event is occurring, the decoder arrangement being arranged to mark as invalid bad data of the decoded digital signal, the decoder arrangement being coupled with the detector for causing the data that appears to be good and which is derived while the analogue signal is substantially altered or destroyed to be marked as good data.

* * * * *